United States Patent [19]

Numata et al.

[11] Patent Number: 4,743,653

[45] Date of Patent: May 10, 1988

[54] TWO COMPONENT POLYURETHANE COATING

[75] Inventors: Syuhei Numata, Hirakata; Masanori Ohiwa, Toyonaka; Toshihiro Maekawa, Suita; Akio Kashihara, Hirakata; Tadafumi Miyazono, Takatsuki, all of Japan

[73] Assignee: Nippon Paint Co., Ltd., Osaka, Japan

[21] Appl. No.: 61,208

[22] Filed: Jun. 12, 1987

[30] Foreign Application Priority Data

Jun. 12, 1986 [JP] Japan ................................ 61-136964
Jun. 12, 1986 [JP] Japan ................................ 61-136966

[51] Int. Cl.$^4$ .............................................. C08G 75/04
[52] U.S. Cl. .................................... 525/125; 525/440; 525/512; 525/528
[58] Field of Search ................. 525/125, 440, 512, 528

[56] References Cited

U.S. PATENT DOCUMENTS 3,784,501  1/1974  Pettit ................................... 525/125

*Primary Examiner*—Maurice J. Welsh
*Attorney, Agent, or Firm*—Wenderoth, Lind & Ponack

[57] ABSTRACT

A two component polyurethane coating consisting of a principal component (A) comprising a hydroxyl group containing film-forming resin, crosslinked polymer particles and a solvent for said film-forming resin, and a hardener component (B) comprising a polyisocyanate compound, which is characterized by using as said crosslinked polymer particles the composite resin particles each comprising a particulate crosslinked polymer core and a number of substantially linear polymer chains coupled with said core in either way of chemical bonding, semi-interpenetration or both of them, the solid weight ratio of said hydroxyl group containing film-forming resin to said composite resin particles being 99/1 to 40/60 and the equivalent ratio of isocyanate groups in the hardener component (B) to hydroxyl groups in the principal component (A) (if the linear polymer chains contain hydroxyl groups, the sum of said hydroxyl groups and those of the hydroxyl group containing film-forming resin) being 0.5 to 2.0.

The coating composition is excellent in dispersion stability, application characteristics and drying fastness and capable of resulting an excellent coat.

7 Claims, No Drawings

TWO COMPONENT POLYURETHANE COATING

FIELD OF THE INVENTION

The present invention relates to a two component polyurethane coating and more specifically, to a two component polyurethane coating containing crosslinked polymer particles which is excellent in dispersion stability, application characteristics and drying fastness, capable of resulting a coating with excellent gloss, transparency and coating appearance, as well as excellent polishing resistance, and hence is quite useful as an auto-repair paint and the like.

BACKGROUND OF THE INVENTION

A two component polyurethane coating consisting of a hardener component of polyisocyanate compound and a resinous component of hydroxyl group containing film-forming resin is being watched with keen interest in various technical fields including auto-repair, wood processing and other industries, because there is no necessity for relying on a high temperature baking operation.

In such a coating, it is highly desired to be of fast-drying nature from the view-point of reduction in processing steps and energy consumption.

Various attempts have been, therefore, made to give the desired fast-drying characteristics to two component polyurethane coatings, but no satisfactory solutions have been found yet.

For example, in an attempt of utilizing as a resinous component an acrylic resin with a higher molecular weight or a higher glass transition temperature (Tg), there are such problems that since a spraying non-volatile matter is in a lower order, the coating must be applied many times and moreover, the coating thus obtained is, in general, no good in appearance.

In an attempt of compounding with a cellulosic resin as nitrocellulose, cellulose acetate butyrate (CAB) and the like, there are almost similar problems as abovementioned. When an increased amount of catalyst is used, the pot-life of the resulted composition is proportionally decreased. And the coating thus obtained is poor in appearance. In an attempt of using as a hardener an aromatic polyisocyanate compound, there is a problem of poor weather resistance. Thus, none of the aforesaid attempts have succeeded in having fruitful results.

Recently, the so-called gellated resin particles having three-dimensionally crosslinked structures and being substantially insoluble in an organic solvent have been proposed. If the gellated resin particles are in the two component polyurethane coating system, it would be probable that the desired fast-drying might be obtained therewith from the combination of pigment filler effect as plastic pigment and hard resin effect of the crosslinked polymer particles.

However, the heretofore proposed crosslinked polymer particles were merely developed for the purpose of high solidification or rheology control of a solvent type coating composition, thereby making up the drawbacks of sagging and cratering tendencies and of deficient weather resistance or the like. Even the slightest consideration had been made as to the possible use of these crosslinked polymer particles in the room temperature curing type polyurethane coatings. Therefore, even when examined with a two component polyurethane coating to be cured at a room temperature, it was unable to get the product being satisfied with every respects of application characteristics, drying property and dispersion stability. The coating thus obtained was in fact poor in gloss, transparency and finishing appearance. Under the circumstances, it is a principal object of the invention to provide a two component polyurethane coating containing crosslinked polymer particles, which is excellent in dispersion stability, application characteristics and drying fastness, capable of resulting a coating with excellent gloss, transparency and appearance, as well as excellent polishing resistance, and which is particularly useful as an auto-repair paint and the like.

SUMMARY OF THE INVENTION

According to the invention, the aforesaid and other objects of the invention shall be attained with a two component polyurethane coating consisting of a principal componet (A) comprising hydroxyl group containing a film-forming resin, crosslinked polymer particles and a solvent for said film-forming resin, and a hardener component (B) comprising a polyisocyanate compound, which is characterized by using as the crosslinked polymer particles the composite resin particles each comprising a particulate crosslinked polymer core and a number of substantially linear polymer chains coupled with said core in either way of chemical bonding, semi-interpenetration or both of them, the solid weight ratio of said hydroxyl groups containing film-forming resin to said composite resin particles being 99/1 to 40/60 and the equivalent ratio of isocyanate groups in the hardener component (B) to hydroxyl groups of the main component (A) (if the linear polymer chains contain hydroxyl groups, the sum of said hydroxyl groups and those of the hydroxyl group containing film-forming resin) being 0.5 to 2.0. The crosslinked polymer particles used in the present invention are the composite resin particles each comprising a particulate crosslinked polymer core and a number of substantially linear polymer chains coupled with said core in either way of chemical bonding, semi-interpenetration or both of them.

The core portion of said particle may be composed of any polymers of polycondensation type as polyester resin, epoxy resin and amino resin or of addition polymerization type as acryl resin and vinyl resin, providing being three-dimensionary crosslinked. The mean diameter of said core portion is preferably in a range of 0.01 to 10μ. The substantially linear polymer chains may be composed of any members selected from acryl resin, polyester resin, polyether resin and the like and however, for preparation easiness, particularly preferable members are acryl resin and vinyl resin.

In the present composite resin particles, said particulate crosslinked polymer core and said substantially linear polymer chains are coupled with each other in either way of chemical bonding, semi-interpenetration or both of them. The composite resin particles each comprising a particulate crosslinked polymer core and a number of substantially linear polymer chains chemically bonded to said core may be advantageously prepared by the method stated in our copending Japanese Pat. Application 90827/86, filed on Apr. 18, 1986 wherein the core particles of crosslinked polymer are first prepared, to which addition polymerizable unsaturated bondings are introduced during or after preparation of said core particles, and addition polymerizable monomers are reacted with the same, thereby forming a number of substantially linear polymer chains chemically bonded to said core, or the core particles of crosslinked polymer bearing appropriate functional groups are prepared, to which a reactive derivative of linear polymer capable of reacting with said functional groups is reacted, thereby forming the desired composite resin particles.

In this type of composite resin particles, the most important members are, from the standview of application range and preparation easiness, acrylic resin particles each comprising a particulate crosslinked acrylic polymer core, to which a number of substantially linear, acrylic polymer chains are chemically bonded. Such particles may be advantageously prepared by the following method. That is, a monomer mixture of (a) a polyfunctional monomer having two or more polymerizable ethylenic groups each having different co-reactivity and (b) polymerizable monomers including a crosslinking monomer which are reactive with one ethylenic group of said polyfunctional monomer (a) is subjected to an emulsion polymerization to obtain an emulsion of particulate materials of crosslinked polymer still having the other ethylenic group of said polyfunctional monomer in free state in the polymer, and after adding polymerizable monomer(s), a graft polymerization is effected to form substantially linear acrylic polymer chains.

The term "polymerizable ethylenic groups each having different co-reactivity" as used herein shall mean the combination of ethylenic groups, one being of selective nature towards the type of copolymerizable monomers as 1,2-di-, 1,1,2-tri- or 1,1,2,2-tetra-substituted ethylene and the other having no such selectivity as mono- or 1,1-disubstituted ethylene group, or the combination of ethylenic groups, one being able to give homopolymer and the other being not, or the combination of ethylenic groups each having different reactivity.

In this invention, any polyfunctional monomer having in its molecule two or more of such ethylenic groups may be advantageously used for the preparation of the present composite resin particles. Examples of such monomers are allyl (meth) acrylate, addition product or allyl glycidyl ether and acrylic or methacrylic acid, addition product of monoallyl amine or diallyl amine and glycidyl (meth) acrylate or (meth) acryloyl bearing isocyanate, addition product of allyl alcohol and (meth) acryloyl bearing isocyanate, addition product of maleic acid or fumaric acid and glycidyl (meth) acrylate, addition product of maleic or fumaric monoester and glycidyl (meth) acrylate, and addition product of unsaturated fatty acid and glycidyl (meth) acrylate.

Among the various ethylenic groups, the unsaturation bonds included in maleic or fumaric acid, or derivatives thereof, i.e. 1,1-di-, 1,1,2-tri, or 1,1,2,2-tetra-substituted ethylenic groups, are selectively reactive with polymerizable aromatic compounds, whereas the unsaturation bonds included in acryloyl or methacryloyl groups, i.e. mono- or 1,1-di-substituted ethylenic groups are nonselective in the type of employable comonomers. Therefore, in a most preferable embodiment, the former is used for the preparation of linear polymer chains and the latter is for the preparation of crosslinked core polymer. Examples of such particularly useful monomers having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, are addition product of maleic acid and glycidyl acrylate, addition product of maleic acid and glycidyl methacrylate, addition product of fumaric acid and glycidyl acrylate, addition product of fumaric acid and glycidyl methacrylate, addition product of maleic acid monoester and glycidyl acrylate, maleic acid monoester and glycidyl methacrylate, addition product of fumaric acid monoester and glycidyl acrylate, addition product of fumaric acid monoester and glycidyl methacrylate, addition product of substituted maleic acid and glycidyl (meth) acrylate, addition product of substituted maleic acid monoester and glycidyl (meth) acrylate, addition product of substituted fumaric acid and glycidyl (meth) acrylate, and addition product of substituted fumaric acid monoester and glycidyl (meth) acrylate.

The abovesaid polyfunctional monomer is combined with other $\alpha,\beta$-ethylenic monomers including a crosslinking monomer and the mixture is subjected to an emulsion polymerization to prepare the particulate crosslinked acrylic polymer. As a crosslinking monomer, any of the known compounds having in its molecule two or more radically polymerizable ethylenic unsaturation bonds may be satisfactorily used, as, for example, a polymerizable unsaturated monocarboxylic acid ester of polyhydric alcohol and a polymerizable unsaturated alcohol ester of polycarboxylic acid. Alternatively, use can be made a combination of compounds each having a mutually reactive functional group and one or more $\alpha,\beta$-ethylenically unsaturation bonds, as, for example, (meth) acrylic acid and glycidyl (meth) acrylate; hydroxy (meth) acrylate and isocyanate alkyl (meth) acrylate (blocked compound); and radically polymerizable silane coupling agents as vinyl trialkoxy silane and (meth) acryloxyalkyl trialkoxy silane and the like.

Other $\alpha,\beta$-ethylenic monomers may be any type of compounds customarily used in the preparation of acrylic resin. However, in order to leave the maleic type double bonds in free form in the resulted polymer, a polymerizable aromatic compound capable of showing a selective reactivity towards said double bonds should be excluded therefrom. Examples of such monomers are classified in the following groups.

(1) carboxyl group containing monomer as, for example, acrylic acid, methacrylic acid, crotonic acid, itaconic acid, maleic acid, fumaric acid and the like, (2) hydroxyl group containing monomer as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like, (3) nitrogen containing alkyl acrylate or methacrylate as, for example, dimethyl aminoethyl acrylate, dimethyl aminoethyl methacrylate and the like, (4) polymerizable amide as, for example, acryl amide, methacryl amide and the like, (5) polymerizable nitrile as, for example, acrylonitrile, methacrylonitrile and the like, (6) alkyl acrylate or methacrylate as, for example, methyl acrylate, methyl methacrylate, ethyl acrylate, n-butyl acrylate, n-butyl methacrylate, 2-ethyl hexyl acrylate and the like, (7) polymerizable glycidyl compound as, for example, glycidyl acrylate, glycidyl methacrylate and the like, (8) α-olefin as, for example, ethylene, propylene and the like,
(9) vinyl compound as, for example, vinyl acetate, vinyl propionate and the like,
(10) diene compound as, for example, butadiene, isoprene and the like, reaction compounds of the abovesaid monomers as, for example, reaction compound of hydroxyl containing monomer (2) with isocyanate compound, reaction compound of carboxyl containing monomer (1) with glycidyl containing compound and the like.

They may be used each singularly or in combination form. The emulsion polymerization may be carried out in a conventional way, using a polymerization initiator and an appropriate emulsifier. Particularly preferable emulsifiers are acrylic, polyester, alkyd or epoxy resin having in its molecule an amphoionic group of the formula:

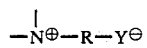

wherein R represents $C_1$ to $C_6$ alkylene or phenylene and $Y^\ominus$ stands for $-COO^\ominus$ or $-SO_3^\ominus$, as disclosed in Japanese Pat. Application Kokai No. 129066/83.

In this first step of polymerization, only mono- or 1,1-disubstituted ethylenic bonds may participate in the reaction, giving crosslinked acrylic polymer particles still having unreacted 1,2-di-, 1,1,2-tri- or 1,1,2,2-tetra-substituted ethylenic unsaturation bonds on the surfaces thereof. Therefore, in the next stage of reaction, a polymerizable aromatic compound is added to the abovesaid emulsion and polymerization is continued to effect a graft polymerization between the remaining ethylenic unsaturation bonds and the polymerizable aromatic compound.

Since 1,2-di-, 1,1,2-tri- or 1,1,2,2-tetra-substituted ethylenic bond has a selective reactivity towards polymerizable aromatic compound as styrene, α-methyl styrene, vinyl toluene, t-butyl styrene and the like, a higher grafting rate can be attained with the aforesaid particulate crosslinked polymer coupled with the polymerizable aromatic compound.

It is of course possible to use, besides the required polymerizable aromatic compound, other polymerizable monomers for the preparation of said linear polymer chains as desired. Such other monomers may be of any kinds as hereinbefore stated. Particulary useful members are monomers with active hydrogen bearing groups as hydroxyl, amino and the like; monomers with acidic groups as carboxyl, sulfonic acid group phosphoric acid group and the like; monomers with basic groups as amino, ammonium and the like; and monomers with such groups as urea, urethane, acid amide and the like, with a higher atomic group cohesive energy of 6500 cal/mol or more.

In another method, the core particles of crosslinked acrylic polymer having functional groups as carboxyl, amino, glycidyl groups or the like are first prepared, addition polymerizable ethylenic bonds are then introduced by the reactions with, for example, glycidyl (meth) acrylate, (meth) acrylic acid or the like, and the aforesaid graft polymerization is carried out to form the desired linear polymer chains.

It is, of course, possible to obtain the desired composite resin particles by the reaction of core particles of crosslinked polymer with appropriate functional groups and a reaction derivative of substantially linear polymer capable of reacting with said functional groups.

In these methods, it does not absolutely necessary for the core portion and the chain portion to be of acrylic nature, and therefore, any polymeric materials hereinbefore stated may be advantageously used as the constituting polymer of said core and said linear chains of the present composite resin particles.

The composite resin particles each comprising a particulate crosslinked polymer core and a number of substantially linear polymer chains coupled with said core in semi-interpenetration relationship are likewise useful in the present invention. These particles have the characteristic semi-interpenetrating polymer network structure, wherein a part of the respective linear polymer chain penetrates into the crosslinked polymer core particle and the remaining part extends outwardly therefrom.

These particles may be advantageously prepared by the method stated in our co-pending Japanese Pat. Application 267019/84, filed Dec. 18, 1984 (now publicly opened as Kokai No. 223015/85), wherein addition polymerizable ethylenic compounds are subjected to a solution polymerization in the presence of crosslinked polymer particles. In that method, the crosslinked polymer core particles may be composed of any type of resins including polycondensation type resins as polyester resin, epoxy resin and amino resin and addition polymerization type resins as acrylic resin and vinyl resin. Such particles may be prepared by any known methods, as, for example, emulsion polymerization, non-aqueous dispersion polymerization, solution polymerization, suspension polymerization and bulk polymerization, providing adopting an optional pulverization and shieving operations. However, since the particle size is preferably selected in a range of 0.01 to 10 μ, particular preference is given to an emulsion polymerization of acrylic monomers. The linear polymer chains are advantageously prepared by the addition polymerziation of polymerizable ethylenic compounds in an organic medium.

As the polymerizable ethylenic compounds, any of the members hereinbefore stated may be satisfactorily used, excepting the polyfunctional and crosslinking monomers. Examples of such polymerizable ethylenic compounds are acrylic acid, methacrylic acid, itaconic acid, maleic acid, fumaric acid and their esters, styrene, vinyl toluene, acrylonitrile, vinyl acetate, acrylamide, N-methylol acrylamide and other similar monomers.

Employable acrylic or methacrylic esters may be represented by the formula:

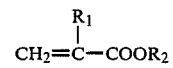

wherein $R_1$ is H or $CH_3$ and $R_2$ is a saturated hydrocarbon having 1 to 15 carbon atoms, including methyl acrylate, methyl methacrylate, butyl acrylate, butyl methacrylate, lauryl acrylate, lauryl methacrylate and the like. Other esters may include the members represented by the abovesaid formula wherein $R_2$ is a saturated hydrocarbon bearing hydroxyl group. Examples of such members are hydroxy propyl acrylate, hydroxy propyl methacrylate, 2-hydroxy ethyl acrylate, and 2-hydroxy ethyl methacrylate. Such composite resin particles may be easily and advantageously prepared by the method wherein addition polymerizable ethylenic compound(s) is (are) polymerized by a solution polymerization in the presence of crosslinked polymer particles.

That is, any of the known solution polymerization techniques may be advantageously used as, for example, by adding into a reaction vessel as radical polymerization initiator (e.g. organic peroxide or organic azo compound), solvent(s), crosslinked polymer particles and polymerizable monomer(s) and heating the mixture to effect polymerization, or by placing, in a reaction vessel, organic solvents and adding, under heating, dropwise a polymerization initiator, crosslinked polymer particles and monomers, or by the combination of said techniques.

In this method, since a part of the polymerizable monomers can get into the crosslinked polymer core particles by infiltration, the intended polymerization is occured both in the inside and the outside of the crosslinked polymer particles. Therefore, when hydroxyl group containing monomer is used in a larger quantity, the reaction product may be used as it is as a mixture of hydroxyl group containing film-forming resin and the composite resin particles in this invention. However, the presence of hydroxyl groups in the linear polymer chains is not essential and when the linear polymer chains are prepared from the ethylenic monomers having no hydroxyl groups, the thus formed composite resin particles are separated from the reaction product and subsequently added with a hydroxyl group containing film-forming resin.

The present composite resin particles may also be of the structure wherein a particulate crosslinked polymer core and a number of substantially linear polymer chains are coupled with each other in both of chemical bonding and semi-interpenetration. Such particles may be advantageously obtained by first preparing the composite resin particles each comprising a particulate crosslinked polymer core and a number of substantially linear polymer chains chemically bonded to said core, and then effecting the solution polymerization of addition polymerizable monomers in the presence of said composite resin particles.

In either type of the abovementioned composite resin particles, a number of substantially linear polymer chains are coupled with the crosslinked polymer core, and therefore, when the resin particles are added to a combination of film-forming resin and solvent, mutual access of the resin particles and agglomeration are effectively controlled by said chain portions, whereby an excellent dispersion stability of the resin particles in the system can be obtained.

Since the chain polymer has a good compatibility with the hydroxyl group containing film-forming resin, said property may contribute to the improvement in finish appearance of the coating. Besides the above, the chain polymer is serviceable for the stabilization of dispersion of pigments if any, by wrapping the same, and for the improvement in gloss, transparency and appearance of the coating because of having a degree of film-forming property by themselves. The core portion is crosslinked and therefore, the composite resin particles may exert pigment filler effect and hard resin effect, giving an excellent two component polyurethane coating having improved drying fastness and polishing resistance.

In the present two component polyurethane coating, the abovesaid composite resin particles are compounded with a hydroxyl group containing film-forming resin as acryl resin, vinyl resin, polyester resin (including alkyd resin) and polyether resin in a solid weight ratio of 1 to 99–60 to 40, preferably 5 to 95–30 to 70. This is because if the amount of composite resin particles is less than 1% by weight of the total solid of the main component comprising the composite resin particles, hydroxyl group containing film-forming resin and solvent, there is a short in drying property, whereas if it exceeds over the upper limit of 60%, there is a decrease in levelling characteristic of the resulted composition, giving an inferior coating appearance after all.

As already stated, various functional groups may be introduced in the linear polymer chains of the present composite resin particles, expecting the particular properties possessed by them. The inventors have found that when the linear polymer is beared with an active hydrogen containing group as hydroxyl and amino, an acidic group or a basic group, drying property of the coating composition is greatly increased because of the improvement in reactivities of the resin particles themselves and of the surrounding atmosphere thereof.

That is, when hydroxyl groups or amino groups capable of reacting with isocyanate groups of the hardener are existent in the linear polymer chains, the composite resin particles per se may take part into the reaction with the hardener, participating directly in the improvement in drying properties of the composition because of the increase in setting and high polymerization tendencies of the particles and in the crosslinking density thereof.

The presence of carboxyl groups and dialkyl amino groups in the polymer chains may participate in the accelerated urethane reaction in the vicinity of the crosslinked resin particles through catalytic action. Thus, the surrounding resin is vigorously reacted and apparently crosslinked, and drying property of the composition can be markedly improved. When urea, urethane, acid amide and other groups whose cohesive energies are as high as 6500 cal/mol or more, are in existent in the linear polymer chains, there is an increase in an initial drying property of the composition due to the increase in glass transition temperature (Tg) of the composite resin. Furthermore, hydrogen bonds are prove to be generated between the composite resin particles and between the particle and the film-forming resin, which are equivalent to weakly crosslinked structures and put them under hardly movable conditions. For this reason, the initial drying property of the composition is further improved and scratch resistance and polishing resistance of the coating are markedly improved.

Thus, in the present invention, by the adoption of the aforesaid composite resin particles, it is possible to provide a two component polyurethane coating which is excellent in drying property and application characteristics and capable of resulting a coating with excellent gloss, transparency and finishing appearance, as well as polishing resistance.

As the hardener component, any of the known polyisocyanate compounds and their prepolymers customarily used in this type of two component polyurethane coatings may be successfully and advantageously used. Therefore, in this invention, the term "polyisocyanate compound" shall include both polyisocyanate compound and prepolymer thereof.

The weight ratio of said hardener component to the resinous materials may be widely varied and however, in the practical sense of view, the equivalent ratio of isocyanate groups in the hardener component to hydroxy groups of the main component resins (if the linear polymer chains contain hydroxyl groups, the sum of said hydroxyl groups and those of the hydroxyl group containing film-forming resin) is usually selected in a range of 0.5 to 2.0.

Other essential components of hydroxyl group containing film-forming resin and solvent may be of any members customarily used in this type of two component polyurethane coatings.

To the principal component (A) and to the hardener component (B) of this invention, any of the additives, auxiliary as, for example, ultra-violet ray absorber, pigments, catalysts, solvents and the like may be added if desired.

In using the present coating composition, the principal component (A) comprising a hydroxyl group containing film-forming resin, composite resin particles and a solvent, and the hardener component (B) are mixed well, diluted with an appropriate volatile medium as thinner, and thus diluted coating is applied in a conventional way as by spraying. Thus prepared coating has a suitable pot-life for spraying or coating, and is excellent in application characteristics and drying. The coating obtained is excellent in smoothness, gloss and transparency and has an excellent polishing property. Therefore, the present coating composition is quite useful for the auto-repair and various coating areas in electric appliance, plastics, wood processing, building and other industries.

The invention shall be now more fully explained in the following examples. Unless otherwise being stated, all parts and percentages are by weight.

REFERENCE EXAMPLE 1

Preparation of hydroxyl group containing polymer

Into a reaction vessel fitted with a stirrer, a thermometer, a nitrogen gas inlet and a reflux condenser, were placed 100 parts of xylene and heated in a nitrogen atmosphere to 120° C. To this, a mixture of 40 parts of styrene, 24 parts of n-butyl methacrylate, 16.9 parts of methyl methacrylate, 0.5 part of methacrylic acid, 18.6 parts of 2-hydroxyethyl methacrylate and 2.1 parts of t-butyl peroxyoctoate was dropwise added in 3 hours. After completion of said addition, the combined mixture was further reacted at the same temperature for 3 hours to obtain an acryl resin varnish (A) having a solid content of 50% and Gardner color of less than 1, the resin having a number average molecular weight of about 8000, Tg of 70° C., OH value per solid of 80 and acid value per solid of 3.3.

REFERENCE EXAMPLE 2

Preparation of dispersion stabilizer

Into a 2 liter flask fitted with a stirrer, a nitrogen gas inlet tube, a thermoregulator, a condenser and a decanter, were placed 134 parts of bishydroxy ethyl taurine, 130 parts of neopentylglycol, 236 parts of azelaic acid, 186 parts of phthalic anhydride and 27 parts of xylene and the mixture was heated while removing the formed water azeotropically with xylene. The temperature was raised to 190° C. in about 2 hours from the commencement of reflux and the reaction was continued under stirring and dehydration until the acid value (based on carboxylic acid group) reached 145. Thereafter, the reaction mixture was allowed to cool to 140° C. and to this, 314 parts of Cardura E-10 (glycidyl versatate, trademark of Shell) were dropwise added in 30 minutes at 140° C. The mixture was stirred at the same temperature for 2 hours and then the reaction was stopped to obtain a polyester resin having an acid value of 59, a hydroxyl value of 90 and a number average molecular weight of 1054.

REFERENCE EXAMPLE 3

Preparation of dispersion stabilizer

Into a similar reaction vessel as used in Reference Example 2, were placed 73.5 parts of taurine Na salt, 100 parts of ethyleneglycol, and 200 parts of ethyleneglycol monomethyl ether, and the mixture was heated, under stirring, to 120° C. At the stage when a uniform solution was obtained, a mixture of 470 parts of Epicohto 1001 (bisphenol A diglycidyl ether type epoxy resin, epoxy equivalent 470, trademark of Shell Chem.) and 400 parts of ethyleneglycol monomethyl ether was dropwise added in 2 hours. After completion of said addition, the combined mixture was heated and stirred for 20 hours. Thus obtained product was then purified and dried to obtain 518 parts of modified epoxy resin, whose acid value (measured by KOH titration method) was 49.4 and sulfur content (measured by fluorescent X ray analysis) was 2.8%.

REFERENCE EXAMPLE 4

Preparation of dispersion stabilizer

Into a 1 liter flask fitted with a stirrer, a thermoregulator, dropping funnels, a nitrogen gas inlet tube and a condenser, were placed 140 parts of ethyleneglycol monomethyl ether and 140 parts of xylene, and the mixture was heated to 120° C. To this, a monomer mixture of 74 parts of methyl methacrylate, 70 parts of 2-ethylhexyl acrylate, 24 parts of 2-hydroxyethyl methacrylate, and 12 parts of methacrylic acid, added with 5 parts of azobisisobutyronitrile and a solution of 20 parts of N-(3-sulfopropyl)-N-methacryloyloxyethyl-N,N-dimethyl ammonium betained in 150 parts of ethyleneglycol monoethyl ether were simultaneously and dropwise added in 3 hours. After elapsing 30 minutes from the completion of said addition, a solution of 0.4 part of t-butylperoxy-2-ethylhexanoate in 8 parts of ethylene glycol monomethyl ether was added and the combined mixture was kept at 120° C. for 1 hour and thereafter, the solvent was removed off to obtain an amphoionic group containing acrylic resin having a non-volatile content of 92%.

REFERENCE EXAMPLE 5

Preparation of monomer containing two polymerizable ethylenic groups each having different co-reactivity Into a 1 liter flask fitted with a stirrer, an air inlet tube, a thermoregulator, and a condenser, were placed 430 parts of mono-butyl maleate and 1.6 parts of hydroquinone and the mixture was heated to 150° C. To this, were dropwise added 373 parts of glycidyl methacrylate in 20 minutes and the combined mixture was maintained at 150° C. for 60 minutes. The reaction was stopped at the stage when the resinous acid value reached 3 KOH mg/g or less.

REFERENCE EXAMPLE 6

Preparation of polymerizable monomer

Into a similar reaction vessel as used in Reference Example 5, were placed 270.4 parts of phenyl isocyanate and 0.9 part of hydroquinone methyl ether and the mixture was heated to 60° C. To this, 286 parts of 2- hydroxyethyl methacrylate were dropwise added in 30 minutes and the combined mixture was maintained at 60° C. for 60 minutes. The reaction was stopeed at the stage when the characteristic absorption of isocyanate group in IR spectrum had been disappeared.

REFERENCE EXAMPLE 7

Preparation of polymerizable monomer

Into a similar reaction vessel as used in Reference Example 4, were placed 260 parts of 2-ethylhexylamine and 1.0 part of hydroquinone methyl ether and the mixture was heated to 60° C. To this, 310 parts of isocyanate ethyl methacrylate were dropwise added in 30 minutes and then the mixture was maintained at 60° C. for 90 minutes. The reaction was stopped at the stage when the characteristic absorption of isocyanate group in IR spectrum had been disappeared.

REFERENCE EXAMPLE 8

Preparation of composite crosslinked resin particles

Into a 1 liter flask fitted with a stirrer, a thermoregulator, a dropping funnel, a nitrogen gas inlet tube and a condenser, were placed 330 parts of deionized water and the temperature was raised to 80° C. Separately, a pre-emulsion was prepared by providing an aqueous dispersion stabilizer solution comprising 12 parts of the amphoionic group containing polyester resin obtained in Reference Example 2, 1.2 parts of dimethyl ethanolamine and 104 parts of deionized water, and gradually adding, while stirring in a disper, a mixture of 66 parts of methyl methacrylate, 60 parts of n-butyl acrylate, 14 parts of allyl methacrylate and 40 parts of ethyleneglycol dimethacrylate thereto. An aqueous initiator solution was also prepared in a separate vessel, by mixing 2 parts of azobiscyanovaleric acid, 1.3 parts of dimethyl ethanolamine and 40 parts of deionized water. To the aforesaid reaction flask, the initiator solution and the pre-emulsion were dropwise added, in 80 minutes and 60 minutes, respectively. However, the addition of said pre-emulsion was started after elapsing 10 minutes from the commencement of addition of said initiator solution. Then, the combined mixture was kept standing at 80° C. for 30 mintues, dropwise added with a mixture of 12 parts of styrene, 4 parts of n-butyl methacrylate, and 4 parts of methyl methacrylate, and a solution of 0.8 part of azobiscyanovaleric acid, 0.6 part of dimethyl ethanolamine and 20 parts of deionized water in 20 mintues, and the combined mixture was kept at the same temperature for 1 hour. Thus obtained emulsion was subjected to a freeze-drying to obtain composite, crosslinked resin particles, which are hereinafter called as gellated particles (a). The mean diameter of said particles in the emulison was 150 nm.

REFERENCE EXAMPLES 9 to 13

The similar composite, crosslinked resin particles were prepared following the procedures of Reference Example 8 but using the materials shown in the following Table 1. Thus obtained particles are hereinafter called as gellated particles (b) to (f). The mean diameters are also shown in Table 1.

TABLE 1

| Reference Example | 8 | 9 | 10 | 11 | 12 | 13 | 14 | 15 |
|---|---|---|---|---|---|---|---|---|
| dispersion stabilizer of Reference Example | 2 | 3 | 2 | 4 | 2 | 2 | 4 | 4 |
| part by weight | 12 | 26 | 24 | 50 | 36 | 20 | 30 | 30 |
| First stage monomers | | | | | | | | |
| methyl methacrylate | 66 | 82 | 30 | 56 | 48 | 4 | 95 | 60 |
| n-butyl acrylate | 60 | 60 | 46 | 32 | 25 | 8 | 75 | 60 |
| ethyleneglycol dimethacrylate | 40 | 24 | 64 | | | | 30 | 80 |
| 1,6-hexanediol dimethacrylate | | | | 42 | 20 | 30 | | |
| allyl methacrylate | 14 | 14 | 20 | | | | | |
| monomer of Reference Example 5 | | | | 10 | 7 | 18 | | |
| Second stage monomers | | | | | | | | |
| styrene | 12 | 10 | 16 | 20 | 12 | 40 | | |
| n-butyl acrylate | | 4 | 6 | 12 | 42 | 26 | | |
| methyl methacrylate | 4 | | 6 | 14 | 25 | 45 | | |
| 2-hydroxyethyl methacrylate | | 6 | 8 | 12 | 13 | 9 | | |
| n-butyl methacrylate | 4 | | | | | | | |
| methacrylic acid | | | | | 2 | | | |
| dimethylaminopropyl methacrylamide | | | | 4 | | | | |
| monomer of Reference Example 6 | | | | | | 8 | | |
| monomer of Reference Example 7 | | | | | | 20 | | |
| mean diameter of emulsion (nm) | 150 | 160 | 110 | 90 | 70 | 120 | 160 | 155 |
| abbreviation, gellated particles | a | b | c | d | e | f | g | h |

REFERENCE EXAMPLE 14

Preparation of crosslinked resin particles for comparison sake

Into a similar reaction vessel as used in Reference Example 8, were placed 330 parts of deionized water and the temperature was raised to 80° C. To this, an aqueous solution comprising 2 parts of azobiscyanovaleric acid, 1.3 parts of dimethyl ethanolamine and 40 parts of deionized water was dropwise added in 80 minutes.

After elapsing 10 minutes from the commencement of said addition, a pre-emulsion comprising 40 parts of dispersion stabilizer obtained in Reference Example 4, 1.2 parts of dimethyl ethanolamine, 104 parts of deionized water, 95 parts of methyl methacrylate, 75 pats of n-butyl acrylate and 30 parts of ethyleneglycol dimethacrylate was simultaneously and dropwise added to the reaction vessel in 60 minutes. After completion of said additions, the combined mixture was maintained at 80° C. for 90 minutes to obtain an emulsion, the mean diameter of emulsion particles being 160 nm.

The said emulsion was then subjected to a spray-drying to obtain the crosslinked resin particles, which are called as gellated particles (g) hereinunder.

REFERENCE EXAMPLE 15

Preparation of crosslinked resin particles for comparison sake

The same procedures as stated in Reference Example 14 were repeated excepting changing the amounts of methyl methacrylate to 60 parts, n-butyl acrylate to 60 parts and ethyleneglycol dimethacrylate to 80 parts to obtain the crosslinked resin particles, which are hereinafter called as gellated particles (h).

Example 1 to 8 and Comparative Examples 1 to 3

Coating compositions were prepared by pre-mixing each indicated amounts (in Table 3) of the acryl resin varnish A obtained in Reference Example 1, the gellated particles (a) to (h) obtained in Reference Examples 8 to 15 and the mixed solvent shown in Table 2, adding the indicated amounts (in Table 3) of hardener component and diluting the thus obtained mixtures with the same mixed solvent to sprayable viscosities.

Each composition was then applied by spraying onto a soft steel plate (0.8 mm thickness) so as to give a dry thickness of 50 to 60μ, and allowed to dry under 20° C. and 75% relative humidity conditions.

TABLE 2

| mixed solvent | |
|---|---|
| Toluene | 40 parts |
| n-butyl acetate | 30 |
| xylene | 20 |
| Solvesso #100 (aromatic hydrocarbon mixture, trademark of Exon) | 10 |

Thus obtained coatings were evaluated as follows.
(1) Drying properties:
Half-curing and complete curing times (minutes) were determined by the method of JIS K 5400 5.8
(2) Water-spot resistance
This test was carried out with the coated plate after keeping 16 hours from the preparation thereof. 2 cc of pure water were placed on the coating as a spot, after elapsing 8 hours, mopped up and the water mark was visually evaluated.
0 . . . no abnormality
X . . . uneven loss of gloss, and water mark
(3) Pencil hardness
After keeping the coated plate for 48 hours, pencil hardness was determined by the method of JIS K 5400 6.14
(4) 60° specular gloss JIS K 5400 6.7 method was used.
(5) Transparency by visual observation
0 . . . no turbidity
X . . . turbid
The test results are shown in Table 3.

TABLE 3

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| Formulation | | | | | | | | | | | |
| acryl resin varnish A | 68 | 68 | 68 | 68 | 68 | 68 | 68 | 63 | 68 | 68 | 68 |
| gellated particles a | 6 | | | | | | | | | | |
| gellated particles b | | 6 | | | | | | | | | |
| gellated particles c | | | 6 | | | | 1.8 | 13.5 | | | 0.2 |
| gellated particles d | | | | 6 | | | | | | | |
| gellated particles e | | | | | 6 | | | | | | |
| gellated particles f | | | | | | 6 | | | | | |
| gellated particles g | | | | | | | | | 6 | | |
| gellated particles h | | | | | | | | | | 6 | |
| mixed solvent | 16.4 | 16.2 | 16.1 | 16.0 | 15.9 | 16.0 | 20.5 | 16.4 | 16.4 | 16.4 | 22.2 |
| Colonate EH* | 9.6 | 9.8 | 9.9 | 10.0 | 10.1 | 10.0 | 9.7 | 9.6 | 9.6 | 9.6 | 9.6 |
| gellated particles % | 15 | 15 | 15 | 15 | 15 | 15 | 5 | 30 | 15 | 15 | 0.5 |
| NCO/OH ratio | 1.0 | 1.0 | 1.0 | 1.0 | 1.0 | 1.0 | 1.0 | 1.0 | 1.0 | 1.0 | 1.0 |
| Test results | | | | | | | | | | | |
| half-curing time | 130 | 120 | 110 | 110 | 110 | 110 | 130 | 90 | 150 | 150 | 230 |
| complete-curing time | 230 | 200 | 180 | 190 | 200 | 200 | 220 | 160 | 250 | 240 | 350 |
| water-spot resistance | O | O | O | O | O | O | O | O | O | O | X |
| pencil hardness | HB | HB | HB | HB | HB | HB | HB | F | HB | HB | 2B |
| 60° specular gloss | 94 | 94 | 94 | 94 | 94 | 94 | 94 | 92 | 91 | 91 | 94 |
| transparency | O | O | O | O | O | O | O | O | X | X | O |

*HMDI prepolymer, trademark of Nihon Polyurethane K.K.

REFERENCE EXAMPLE 16

Preparation of crosslinked resin particles

Into a reaction vessel fitted with a stirrer, a thermoregulator, a dropping funnel, a nitrogen gas inlet and a condenser, were placed 330 parts of deionized water and heated to 80° C. Separately, a pre-emulsion was prepared by providing an aqueous dispersion stabilizer solution comprising 16 parts of the amphoionic group containing polyester resin obtained in Reference Example 2, 1.6 parts of dimethyl ethanolamine and 104 parts of deionized water, and gradually adding, while stiring in a disper, a mixture of 70 parts of methyl methacrylate, 70 parts of n-butyl acrylate and 60 parts of ethyleneglycol dimethacrylate thereto. An aqueous initiator solution was also prepared in a separate vessel, by mixing 2 parts of azobiscyanovaleric acid, 1.3 parts of dimethyl ethanolamine and 80 parts of deionized water. To the aforesaid reaction flask, the initiator solution and the pre-emulsion were dropwise added, in 80 minutes and 60 minutes, respectively. However, the addition of said pre-emulsion was started after elapsing 10 minutes from the commencement of addition of said initiator solution. Then, the combined mixture was kept standing at 80° C. for 60 minutes to obtain an emulsion and said emulsion was subjected to a freeze-drying to obtain the crosslinked resin particles, which was called, hereinunder, as gellated particles (1).

REFERENCE EXAMPLE 17

Preparation of crosslinked resin particles

Into a similar reaction vessel as used in Reference Example 16, were placed 330 parts of deionized water and heated to 80° C. Separately, a pre-emulsion was prepared from 16 parts of the amphoionic group containing polyester resin obtained in Reference Example 2, 1.6 parts of dimethyl ethanolamine, 104 parts of deionized water, 60 parts of methyl methacrylate, 50 parts of n-butyl acrylate, 40 parts of ethyleneglycol dimethacrylate and 10 parts of the monomer obtained in Reference Example 5. An initiator solution of 2 parts of azobiscyanovaleric acid, 1.3 parts of dimethyl ethanolamine and 80 parts of deionized water was also prepared. To the aforesaid reaction flask, the initiator solution and the pre-emulsion were dropwise added, in 80 minutes and 60 minutes, respectively. However, the addition of said pre-emulsion was started after elapsing 10 minutes from the commencement of addition of said initiator solution. Then, the combined mixture was kept standing at 80° C. for 30 minutes, dropwise added with a mixture of 20 parts of styrene, 12 parts of n-butyl methacrylate, and 8 parts of 2-hydroxyethyl methacrylate, and a solution of 0.8 part of azobiscyanovaleric acid, 0.6 part of dimethyl ethanoalmine and 20 parts of deionized water in 20 minutes, and the combined mixture was kept at the same temperature for 1 hour. Thus obtained emulsion was subjected to a freeze-drying to obtain crosslinked resin particles, which was afterward called as gellated particles (2).

REFERENCE EXAMPLE 18

Preparation of resinous varnish B

Into a similar reaction vessel as used in Reference Example 16, was placed a dispersion comprising 50 parts of xylene, 50 parts of butyl acetate and 15 parts of the gellated particles (1) and heated, under nitrogen gas stream, to 120° C. To this, a mixture (i) of the following Table 4 was dropwise added in 3 hours and after completion of said addition, the combined mixture was maintained at 120° C. for 2 hours to obtain a resinous varnish B.

REFERENCE EXAMPLES 19 to 25

The similar resinous varnishes C to I were prepared in the same way as stated in Reference Example 18, using the materials shown in Table 4.

EXAMPLE 9 to 14 AND COMPARATIVE EXAMPLES 4 to 7

Following the prescriptions shown in Table 5, various coating compositions were prepared by pre-mixing the resinous varnishes B to I obtained in Reference Examples 18 to 25, the gellated particles (1), Colonate EH (isocyanate prepolymer, trademark of Nihon Polyurethane K.K.) and dibutyl tin di-laurate, and diluting thus obtained mixture with a mixed solvent comprising 40 parts of toluene, 30 parts of n-butyl acetate, 20 parts of xylene and 10 parts of Solvesso #100 (aromatic hydrocarbon mixture, trademark of Exon) to sprayable viscosities.

Thus obtained compositions each was applied by spraying onto a soft steel plate (0.8 mm thickness) so as to give a dry thickness of 50 to 60μ and allowed to drying under 20° C. and 75% relative humidity conditions. Thus obtained coatings were evaluated as hereinbefore stated and the test results were shown in Table 5

In these tests, PGD value was measured by using PGD IV carrying-type gloss-meter manufactured by Nihon Shikisai Kenkyu-sho.

TABLE 4

| Reference Example | 18 | 19 | 20 | 21 | 22 | 23 | 24 | 25 |
|---|---|---|---|---|---|---|---|---|
| Charged materials | | | | | | | | |
| xylene | 50 | 50 | 50 | 50 | 50 | 50 | 50 | 50 |
| n-butyl acetate | 50 | 50 | 50 | 50 | 50 | 50 | 50 | 50 |
| gellated particles (1) | 15 | 15 | | | | | | |
| gellated particles (2) | | | 15 | | | | | |
| Dropped mixture | (i) | (ii) | (iii) | (iv) | (v) | (vi) | (vii) | (viii) |
| styrene | 34 | 34 | 34 | 32 | 38 | 28 | 40 | 40 |
| n-butyl methacrylate | 20.8 | 20.5 | 20 | 18.8 | 23.3 | 17.2 | 24.5 | 24 |
| methyl methacrylate | 14.4 | 14.4 | 14.2 | 13.4 | 16.0 | 11.8 | 16.9 | 16.9 |
| 2-hydroxyethyl methacrylate | 15.8 | 15.8 | 15.8 | 15.8 | 17.7 | 13.0 | 18.6 | 18.6 |
| tributyl tin methacrylate | | 0.3 | | | | | | |
| dimethyl aminoethyl methacrylate | | | | 1 | | | | |
| dimethyl aminopropyl methacrylamide | | | | | 5 | | | |
| gellated particles (2) | | | | 15 | 5 | 30 | | 0.5 |
| t-butyl peroxyoctoate | 2.1 | 2.1 | 2.1 | 2.1 | 2.1 | 2.1 | 2.1 | 2.1 |
| non-volatile content (%) | 50 | 50 | 50 | 50 | 50 | 50 | 50 | 50 |
| gellated particles (%) | 15 | 15 | 15 | 15 | 5 | 30 | 0 | 0.5 |
| varnish No. | B | C | D | E | F | G | H | I |

TABLE 5

| | (parts by weight) | | | | | | | | | |
|---|---|---|---|---|---|---|---|---|---|---|
| | Example | | | | | | Comparative Example | | | |
| | 9 | 10 | 11 | 12 | 13 | 14 | 4 | 5 | 6 | 7 |
| Formulation | | | | | | | | | | |
| varnish B | 80 | | | | | | | | | |
| varnish C | | 80 | | | | | | | | |
| varnish D | | | 80 | | | | | | | |
| varnish E | | | | 80 | | | | | | |
| varnish F | | | | | 80 | | | | | |
| varnish G | | | | | | 80 | | | | |
| varnish H | | | | | | | 80 | | 80 | 80 |
| varnish I | | | | | | | | 80 | | |
| gellated particles (1) | | | | | | | 7.0 | | | |
| toluene | 10.3 | 10.3 | 9.9 | 9.9 | 9.0 | 11.3 | 1.6 | 8.5 | | |
| Colonate EH | 9.7 | 9.7 | 10.1 | 10.1 | 11.0 | 8.7 | 11.4 | 11.5 | 11.4 | 11.4 |
| dibutyl tin di-laurate | | | | | | | | | 0.03 | 0.005 |
| Evaluation | | | | | | | | | | |
| half-curing time (min.) | 140 | 110 | 110 | 110 | 110 | 80 | 150 | 200 | 140 | 200 |

TABLE 5-continued

| | (parts by weight) | | | | | | | | | |
|---|---|---|---|---|---|---|---|---|---|---|
| | Example | | | | | | Comparative Example | | | |
| | 9 | 10 | 11 | 12 | 13 | 14 | 4 | 5 | 6 | 7 |
| complete-curing time (min.) | 240 | 180 | 180 | 180 | 200 | 120 | 250 | 300 | 260 | 330 |
| water-spot resistance | O | O | O | O | O | O | O | X | O | X |
| pencil hardness | HB | HB | HB | HB | HB | F | HB | B | HB | B |
| 60° specular gloss | 94 | 92 | 93 | 93 | 94 | 90 | 92 | 94 | 83 | 93 |
| transparency | O | O | O | O | O | O | X | O | O | O |
| PGD value | 0.9 | 0.9 | 0.9 | 0.9 | 0.9 | 0.8 | 0.7 | 0.9 | 0.4 | 0.9 |

What is claimed is:

1. A two component polyurethane coating consisting of a principal component (A) comprising a hydroxyl group containing film-forming resin, crosslinked polymer particles and a solvent for said film-forming resin, and a hardener component (B) comprising a polyisocyanate compound, which is characterized by using as said crosslinked polymer particles the composite resin particles each comprising a particulate crosslinked polymer core and a number of substantially linear polymer chains coupled with said core in either way of chemical bonding, semi-interpenetration or both of them, the solid weight ratio of said hydroxyl group containing film-forming resin to said composite resin particles being 99/1 to 40/60 and the equivalent ratio of isocyanate groups in the hardener component (B) to hydroxyl groups in the principal component (A) (if the linear polymer chains contain hydroxyl groups, the sum of said hydroxyl groups and those of the hydroxyl group containing film-forming resin) being 0.5 to 2.0.

2. The two component polyurethane coating according to claim 1, wherein the film-forming resin is selected from the group consisting of acryl resin, vinyl resin, polyester resin and polyether resin.

3. The two component polyurethane coating according to claim 1, wherein the core polymer is selected from the group consisting of polyester resin, epoxy resin, amino resin, acryl resin and vinyl resin.

4. The two component polyurethane coating according to claim 1, wherein the substantially linear polymer is selected from the group consisting of acryl resin and vinyl resin.

5. The two component polyurethane coating according to claim 4, wherein the substantially linear polymer contains active hydrogen bearing groups.

6. The two component polyurethane coating according to claim 5, wherein the substantially linear polymer contains acid or basic groups.

7. The two component polyurethane coating according to claim 4, wherein the substantially linear polymer contains groups whose atomic group cohesive energy is 6500 cal/mol or more.

* * * * *